US007562307B2

(12) United States Patent
Betts et al.

(10) Patent No.: US 7,562,307 B2
(45) Date of Patent: Jul. 14, 2009

(54) AUTOMATED CREATION OF WEB PAGE TO XML TRANSLATION SERVERS

(75) Inventors: Christopher Betts, Mt. Dandenong (AU); Trudi Ersvaer, Victoria (AU)

(73) Assignee: Computer Associates Think, Inc., Islandia, NY (US)

( * ) Notice: Subject to any disclaimer, the term of this patent is extended or adjusted under 35 U.S.C. 154(b) by 519 days.

(21) Appl. No.: 11/132,703

(22) Filed: May 19, 2005

(65) Prior Publication Data

US 2006/0004768 A1 Jan. 5, 2006

Related U.S. Application Data

(60) Provisional application No. 60/573,451, filed on May 21, 2004.

(51) Int. Cl.
*G06F 3/00* (2006.01)
(52) U.S. Cl. .................. 715/762; 715/760; 717/104
(58) Field of Classification Search ......... 715/760–764; 707/10; 717/104–109, 136, 148
See application file for complete search history.

(56) References Cited

U.S. PATENT DOCUMENTS

| | | | | |
|---|---|---|---|---|
| 6,404,445 B1 * | 6/2002 | Galea et al. | | 715/853 |
| 6,948,133 B2 * | 9/2005 | Haley | | 715/780 |
| 6,961,900 B1 * | 11/2005 | Sprague et al. | | 715/202 |
| 7,152,090 B2 * | 12/2006 | Amirisetty et al. | | 703/200 |
| 7,284,239 B1 * | 10/2007 | Young et al. | | 717/137 |
| 2003/0018661 A1 | 1/2003 | Darugar | | 707/500 |
| 2003/0163603 A1 | 8/2003 | Fry et al. | | 709/328 |
| 2003/0172193 A1 * | 9/2003 | Olsen | | 709/315 |
| 2004/0183832 A1 * | 9/2004 | Baccou | | 345/762 |
| 2004/0199614 A1 * | 10/2004 | Shenfield et al. | | 709/220 |
| 2006/0236254 A1 * | 10/2006 | Mateescu et al. | | 715/762 |

OTHER PUBLICATIONS

Sahuguet et al., "*Looking at the Web Through XML Glasses*", Cooperative Information Systems, COOPIS '99, Proceedings, International Conference on Edinburgh, UK, (XP010351848), pp. 148-159, Sep. 1999.

Heather Kreger, "*Web Services Conceptual Architecture (WSCA 1.0)*" IBM Software Group, (XP002203346), 42 pages, May 2001.

Jianguo Lu et al., "*Extensible Information Brokers*", International Journal on Artifical Intelligence Tools, World Scientific, Singapore, vol. 11, No. 1. (XP002344137) pp. 95-115, Mar. 2002.

PCT Invitation to Pay Additional Fees for Application No. PCT/US2005/017578, filed May 19, 2005, (8 pages), Nov. 2, 2005.

* cited by examiner

*Primary Examiner*—Steven B Theriault
*Assistant Examiner*—Enrique W Iturralde
(74) *Attorney, Agent, or Firm*—Baker Botts L.L.P.

(57) ABSTRACT

A method for mapping information entered through a GUI program to an XML message, includes parsing information entered through the GUI program to extract one or more data elements, mapping the data elements to XML data, the mapping being performed according to predetermined criteria and assembling the XML data to an XML message.

40 Claims, 14 Drawing Sheets

Fig. 1

```
101— <finex:TransactionStatement IssueInstant='2004-03-18T17:12:24Z' MinorVersion='1'
102—    RequestID='IDcb8038ea-befa-4cd2-a777-2cd24413d7d4' MajorVersion='1'
103—    xmlns:finex='urn:example:names:tc:FINEX:1.0:transaction'
104—    xmlns:finexval='urn:example:names:tc:FINEX:1.0:value'>
105—    <finex:StatementInstance>
106—       <finex:TransactionAmount currency = "US">
107—          100
108—       </finex:TransactionAmount>
109—       <finex:TransactionSource>
110—          <finexval:NameIdentifier
111—             Format='urn:oasis:name:tc:FINEX:1.1:nameid-format:X509SubjectName'>
112—             cn=Joe Smith, o=The Organization, c=US
113—          </finexval:NameIdentifier>
114—       </finex:TransactionSource>
115—       <finex:TransactionDestination>
116—          <finexval:NameIdentifier
117—             Format='urn:oasis:names:tc:FINEX.1.1:nameid-format:X509SubjectName'>
118—             cn=First Web Bank, o=World Banking Cartel, c=US
119—          </finexval:NameIdentifier>
120—       </finex:TransactionDestination>
121—       <finex:TransactionDate>
122—          <finexval:DateIdentifier>
123—             Format='urn:oasis:names:tc:FINEX:1.1:date-format:UCT'>
124—             Z20040317130200.000
125—          </finexval:DateIdentifier>
126—       </finex:TransactionDate>
127—    </finex:StatementInstance>
128— </finex:TransactionStatement>
```

```
                                                              82
Name:    Joe Smith Amount to transfer:
                        $ 100

Name of the destination bank:
                                    First Web Bank
```

Fig. 10

```
301— <finex:TransactionStatement IssueInstant='2004-03-18T17:12:24Z' MinorVersion='1'
302—   RequestID='IDcb8038ea-befa-4cd2-a777-2cd24413d7d4' MajorVersion='1'
303—   xmlns:finex='urn:example:names:tc:FINEX:1.0:transaction'
304—   xmlns:finexval='urn:example:names:tc:FINEX:1.0:value'>
305—   <finex:StatementInstance>
306—     <finex:TransactionAmount currency = "US">
307—       100
308—     </finex:TransactionAmount>
309—     <finex:TransactionSource>
310—       <finexval:NameIdentifier
311—         Format='urn:oasis:name:tc:FINEX:1.1:nameid-format:X509SubjectName'>
312—         cn=Joe Smith, o=The Organization, c=US
313—       </finexval:NameIdentifier>
314—     </finex:TransactionSource>
315—     <finex:TransactionDestination>
316—       <finexval:NameIdentifier
317—         Format='urn:oasis:names:tc:FINEX.1.1:nameid-format:X509SubjectName'>
318—         cn=First Web Bank, o=World Banking Cartel, c=US
319—       </finexval:NameIdentifier>
320—     </finex:TransactionDestination>
321—     <finex:TransactionDate>
322—       <finexval:DateIdentifier>
323—         Format='urn:oasis:names:tc:FINEX:1.1:date-format:UCT'>
324—         Z20040317130200.000
325—       </finexval:DateIdentifier>
326—     </finex:TransactionDate>
327—   </finex:StatementInstance>
328— </finex:TransactionStatement>
```

401— <finex:TransactionAmount currency="US">

402— {amount}

403— </finex:TransactionAmount>

Fig. 12

501— `<finex:TransactionResponse IssueInstant='2004-03-18T17:12:30Z' MinorVersion='1'`
502— `RequestID='IDcb8038ea-befa-4cd2-a777-2cd24413d7d4' MajorVersion='1'`
503— `xmlns: finex='urn:example:names:tc:FINEX:1.0:transaction'`
504— `xmlns:finexval='urn:example:names:tc:FINEX:1.0:value'>`
505— `<finex:ResponseStatus>`
506— Success
507— `</finex:ResponseStatus>`
508— `<finex:TransactionAmount currency="US">`
509— 100
510— `</finex:TransactionAmount>`
511— `<finex:Response>`

Fig. 13

601— `<finex:TransactionResponse *>`

602— `<finex:ResponseStatus>`

603— `{status}`

604— `</finex:ResponseStatus>`

605— `<finex:TransactionAmount *>`

606— `{amount}`

607— `</finex:TransactionAmount>`

608— `<finex:Response>`

AUTOMATED CREATION OF WEB PAGE TO XML TRANSLATION SERVERS

REFERENCE TO RELATED APPLICATION

The present disclosure is based on and claims the benefit of Provisional Application Ser. No. 60/573,451 filed May 21, 2004, the entire contents of which are herein incorporated by reference.

BACKGROUND

1. Technical Field

The present disclosure relates to web server creation and, more specifically, to automated creation of web page to XML translation servers.

2. Description of the Related Art

Web based applications, for example, web services, are quickly transforming the way modern businesses interact and share information. Web services are software systems for providing particular functionality over a computer network, for example, the Internet. Web services can generally be identified by Universal Resource Identifiers (URI) in a fashion that may be analogous to the way websites may be identified by Uniform Resource Locators (URLs). Web services generally contain public interfaces and bindings that enable human users and other software systems such as other web services to utilize the functionality of the web services. In this way, web services enhance the way computers communicate with users and each other.

Graphical User Interfaces provide a way to communicate information to and from a user. A GUI may be in the form of web pages, allowing a user to read and manipulate data on a web browser. Since web pages are written in the standard language HTML, and since most personal computers have a web browser installed, a GUI in the form of a web page is convenient and popular. Web browsers use the HTTP protocol to receive and to send data to web servers.

Extensible Markup Language (XML) is a popular language by which web services communicate with one another and with human users. XML is a human readable programming language. XML instructions can be read and understood by a human, as opposed to, for example, computer languages that send instructions as binary data.

Because XML is human readable, instructions formulated in XML may be read and interpreted by any computer utilizing any platform. This stands in contrast to computer languages, such as assembly language, that are hardware specific and not human readable. This ability to be interpreted across platforms makes XML a very good tool for communicating with web services.

Unlike Hypertext Markup Language (HTML) where programs use predefined markup symbols to describe data that is communicated, XML allows for the use of customized markup symbols that may be user defined. Definitions of customized XML markup symbols comprise an XML schema. The XML schema is therefore an important element for interpreting data communicated using XML.

While data communicated in XML, for example, data that has been provided to a user from a web service, may be human readable, raw XML data may not be easily understood by the average user who is not a computer programmer. It is therefore desirable to use a GUI to display XML data in a more palatable format.

A GUI may be developed for interpreting XML data from a particular web service. The GUI may be programmed to display anticipated data elements in a predefined format. Many GUIs are web browser based, allowing a user to view XML data via a web browser. However, GUIs, for example web browser based GUIs, may be difficult and/or time consuming to develop. Additionally, these GUIs are generally specific for displaying data from a particular data source, for example, a particular web service. After a GUI has been developed, the GUI is reprogrammed when the user desires to change the look and/or feel of the GUI.

It is therefore desirable to be able to automatically interpret XML data and automatically generate a suitable GUI for displaying the interpreted XML data in a sensible and customizable format.

Java Architecture for XML Binding (JAXB), from Sun Microsystems, as well as the Castor project (castor.org) allow for the parsing and conversion of XML data into Java. This system allows XML data to be interpreted and converted into a set of Java classes so XML data can be displayed and manipulated in Java. However, a GUI may still have to be programmed to implement the display and manipulation of the data.

HTML documents may include data, such as text, as well as markup symbols (tags) that may communicate details about how the data is to be displayed. An HTML browser, such as a web browser, is able interpret the tags and use them to display the HTML data in an appropriate fashion. HTML data can be used to describe the basic format of a user interface, such as the color and font of text as well as the size and position of links and controls. However, HTML does not have the versatility of XML. HTML, while suitable for the display of standard web pages, may not be suitable for the communication of web service data. Additionally, the user interface of HTML data is generally pre-programmed by an HTML programmer and as such a GUI is not automatically generated.

More recent approaches have been developed for the description of GUIs using XML based languages. For example, User Interface Markup Language (UIML) is an XML based language for defining user interfaces. However these XML based GUI description languages still require significant programmer input to design the various GUI details such as item placement, colors, page layout and so on.

There is therefore a need for a way of automatically generating a user interface for the display and manipulation of data, for example XML and/or web service data, even when no user interface information is included in the data.

The present disclosure provides a method for automatic generation of a GUI program from a XML schema. The GUI program may be a web page, allowing the user to read and manipulate data on a web browser.

Once a GUI program is created, it is desirable to provide a two-way interactive communication between the GUI and the web service. To achieve this, it is desirable that a server program (or server programs) perform a translation function between the GUI and the XML web service. A server program will take the data the user created or changed through a web page and map it to an XML message, to be sent to the web service. The data the user created on the web page may be obtained from an HTTP GET or POST operation derived from the HTML web page form. If a response from the web service comes, a server program will take the XML message and transform it to HTML information to be displayed on the web GUI. These server programs are referred to as "translation servers". However, manually writing these server programs from scratch for every web service message is repetitive, cumbersome and error prone.

As noted above, a number of tools (e.g. 'Castor' from castor.org, 'JAXB' from sun.com) provide for automatic creation of Java classes from XML schema. These Java classes provide programmers with an automated way of translating XML data into data structures that can be easily used within a program. However, these schema derived Java classes are simply containers for data, and do not provide any automated way for processing HTTP data from a web page GUI to construct the final XML. This step is still done manually.

There are also numerous tools (e.g. Apache Axis and Microsoft .NET) that will construct XML descriptions from existing server programs. However, there is no corresponding mechanism to do the reverse step, to automatically create server programs from XML descriptions. The present practice is to do the writing manually.

There is therefore a need for a way of automatically generating server programs that will translate data created through a GUI, specifically, data derived from a web page, to an XML message, to be sent to the web service, and also to do the reverse mapping of XML messages to information to be displayed in the GUI. There is a need for a way for allowing two-way interactive communication between the web page and the web service.

SUMMARY

A method for mapping information entered through a GUI program to an XML message comprises parsing information entered through the GUI program to extract one or more data elements, mapping the data elements to XML data, the mapping being performed according to predetermined criteria and assembling the XML data to an XML message.

A method for mapping an XML message to information that is expected by a GUI program, comprises extracting raw XML data from an XML message, mapping the XML data to relevant data elements, the mapping being performed according to predetermined criteria and assembling the data elements to information that is expected by a GUI program.

A method for automatic provision of a GUI and a two-way communication between said GUI and a XML aware application, comprises generating a GUI program from XML data and creating at least one translation server program that performs mapping between XML messages to or from the XML aware application, and information obtained from or destined for the GUI program.

A system for mapping information entered through a GUI program to an XML message, comprises parsing the information entered through the GUI program to extract one or more data elements, mapping the data elements to XML data, the mapping being performed according to predetermined criteria and assembling the XML data to an XML message.

A system for automatically generating server program code that maps an XML message to information that is expected by a GUI program, comprises an extracting unit for extracting XML data from an XML message, a mapping unit for mapping the XML data to relevant data elements, the mapping being performed according to predetermined criteria and an assembling unit for assembling the relevant data elements to information that is expected by a GUI program.

A system for automatic provision of a GUI and a two-way communication between said GUI and a XML aware application, comprises a generating unit for automatically generating a GUI program from XML data and a code-generation unit for automatically generating at least one translation server program that performs mapping between XML messages to or from the XML aware application, and information obtained from or destined for the GUI program.

A computer system comprising a processor and a computer recording medium including computer executable code executable by the processor for mapping information entered through a GUI program to an XML message, said computer executable code comprising code for parsing information entered through the GUI program to extract one or more data elements, code for mapping the data elements to XML data, the mapping being performed according to predetermined criteria and code for assembling the XML data to an XML message.

A computer system comprising a processor and a program recording medium including computer executable code executable by the processor for mapping an XML message to information that is expected by a GUI program, said computer executable code comprising code for extracting raw XML data from an XML message, code for mapping the XML data to relevant data elements, the mapping being performed according to predetermined criteria and code for assembling the data elements to information that is expected by a GUI program.

A computer system comprising a processor and a computer recording medium including computer executable code executable by the processor for automatic provision of a GUI and a two-way communication between the said GUI and a XML aware applications said computer executable code comprising code for generating a GUI program from XML data and code for creating at least one translation server program that performs mapping between XML messages to or from the XML aware application, and information obtained from or destined for the GUI program.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 is an example of XML data that may be sent by a web service;

FIG. 9 shows exemplary data of a simple bank transaction;

FIG. 10 shows XML data corresponding to the data depicted in FIG. 9;

FIG. 11 shows an XML template according to an embodiment of the present disclosure;

FIG. 12 shows an XML response message according to an embodiment of the present disclosure;

FIG. 13 shows a template for extracting key data from the XML response message, according to an embodiment of the present disclosure.

DETAILED DESCRIPTION

Figure 2:
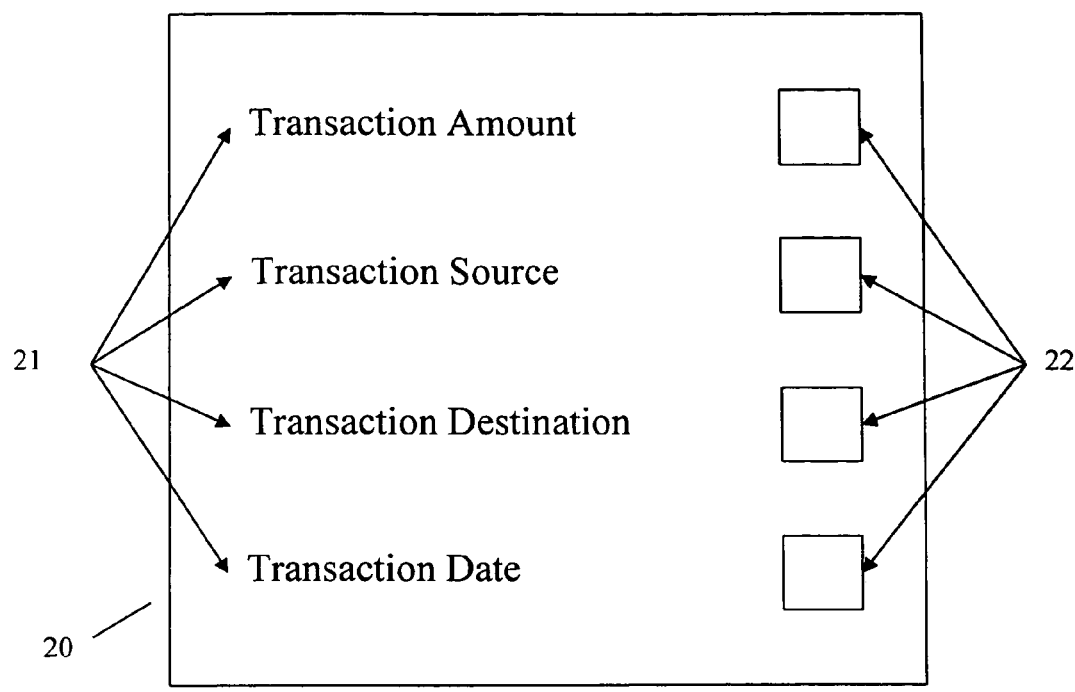
FIG. 2 is an example of a GUI element created to show the statement instance described in the XML data of FIG. 1 according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure can automatically generate a Graphical User Interface (GUI) for the display and manipulation of data, for example XML and/or web service data, even when no user interface information is included in the data.

While this XML data is human readable, users who are not computer programmers may have a very difficult time making sense of the data, and may not be able to adequately manipulate the data into a desired form. However, the highly-standardized nature of XML may be used as a basis for which a GUI may be automatically generated.

XML includes various basic markup symbols that represent various primitive data types. These primitive data types may include, for example: string, boolean, decimal, float, double, duration, dateTime, time, date, etc. A more complete list of primitive XML data types are described in the XML Schema Specification, as set by the World Wide Web Consortium. XML data may include one or more data elements that may be defined by primitive data types. For example, a data element called totalWeight may have a decimal data type and a value of $37 \times 10^{-4}$.

As stated above, XML allows for the definition of custom markup symbols that correspond with custom data types. Custom data types may be more complex than the primitive data types. Custom data types may be formed from various combinations of primitive data types. For example, a data type called personnelFile may be made up of an employee name data element called employeeName that may have a string data type and a value of "Jim", a date-of-birth data element called dateOfBirth that may have a date data type and a value of 1975-05-14, and a social security number data element called socialSecurity that may have a decimal data type and a value of $567287364 \times 10^0$.

Embodiments of the present disclosure automatically parse and interpret the XML data to isolate the data type and value of data elements within the XML data. For example, if XML data included an element with a totalWeight data type, parsing the data would include determining the presence of a data element with a data type of totalWeight, determining that the data type is a decimal, and determining that the value of this data element is $37 \times 10^{-4}$.

Where the XML data to parse includes a data element with a custom data type such as personnelFile, parsing the XML data would include parsing each data element with a primitive data type within the data element with the custom type, and then parsing the data element with the custom type with respect to the primitive data types.

A GUI element may be automatically created for each data element within the XML data in accordance with pre-determined criteria. A basic GUI element may be a screen or a window that displays the data element in a manner that is consistent with the data element's data type. A basic GUI element may also provide for the manipulation of the displayed data. For example, displayed data may be sorted, altered, printed, saved, etc.

Basic GUI elements can be automatically generated for the display of XML data by creating a GUI element for each data element having a primitive data type. For example, a text field may be generated for displaying string data, a numeric field may be generated for displaying decimal data, and a calendar may be generated for displaying date data. For example, one way to create a basic GUI element is to apply a pre-programmed basic GUI element to the data element based on its primitive data type where a pre-programmed basic GUI element is available for each primitive data type defined Custom GUI elements can be automatically generated for the display of XML data by automatically creating a GUI element for each element of data having a custom data type. Because custom data types are generally formed from various combinations of primitive data types, custom GUI elements can be generated using various combinations of primitive GUI elements. For example, a GUI element generated for data having a personelFile data type, as described above, may be a window displaying a heading titled "personelFile" along with a text field labeled "employeeName" for displaying string data; a numeric field labeled "socialSecurity" for displaying decimal data, and a calendar field labeled "dateOfBirth" for displaying date data. The fields may be filled in with their respective values.

Custom GUI elements may display data elements in the same order as they are listed in the XML data. In addition, the names of the data elements may be displayed along with the GUI elements to give the listed GUI elements some basic context.

FIG. 1 is an example of XML data 100 that could be sent by a web service. The XML data 100-128 describes a financial transaction statements (TransactionStatement) data element having one statement instance (Statementinstance) data element 105-127. The statement instance data element 105-127 has a transaction amount (TransactionAmount) data element 106-108, transaction source (TransactionSource) data element 109-114, transaction destination (TransactionDestination) data element 115-120, and a transaction date (TransactionDate) data element 121-126. The statement instance 105-127 is of a custom data type made up of data elements defined by primitive data types. Here, transaction amount may be a decimal data type 107, transaction source may be a string data type 112, transaction destination may be a string data type 118, and transaction date may be a dateTime data type 124.

FIG. 2 is an example GUI element that can show the statement instance 105-127 according to an embodiment of the present disclosure. A GUI element for displaying a transaction statement 20 is automatically created. Four field names 21 are created for each of the four data elements that may appear as part of the statement instance 105-127. Four fields 22 are created for displaying the values associated with each of the four data elements. These fields may be programmed to display the associated XML data elements in a manner that is appropriate for their primary data types. For example, transaction amount may be a decimal data type and may therefore be displayed as a number.

XML data may be hierarchical. For example, a transaction statement may include multiple statement instances that are nested within the transaction statement. Where multiple statement instances exist, a GUI element may automatically be created that lists all of the statement instances, however, the GUI element need not display the data elements that comprise the listed statement instances. Each statement instance may be expandable such that when selected by a user, the data elements within the selected statement instance may be displayed.

Figure 3:
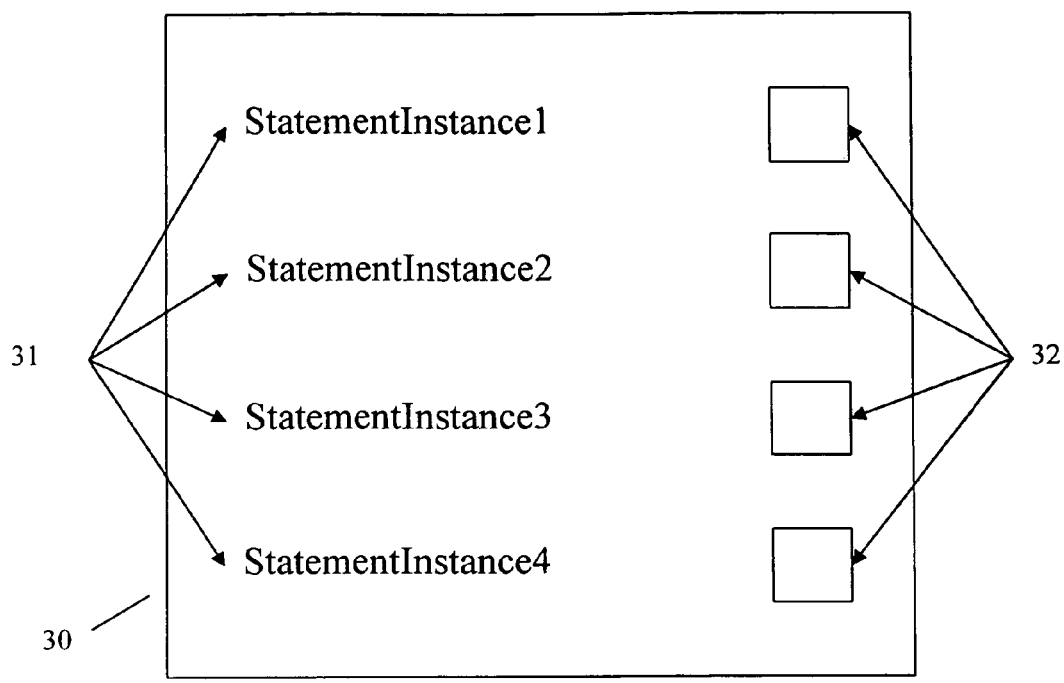
FIG. 3 is an example of a GUI element showing statement instances.

FIG. 3 is an example GUI element 30 showing four statement instances 31. If each statement instance is named within the XML data, those names may appear in corresponding value fields 32. Alternatively, the first data element value within the statement instance is displayed in the corresponding value field. For example, the transaction amount data element value may be displayed. When a particular instance is selected by the user, a GUI element representing that particular statement instance data element may be displayed as shown in FIG. 2.

Expanded GUI elements may be collapsible. By collapsing a GUI element, a user may return to the GUI element listing statement instances 30. By expanding and collapsing GUI elements, a user may navigate through displays of hierarchical data.

Figure 4:
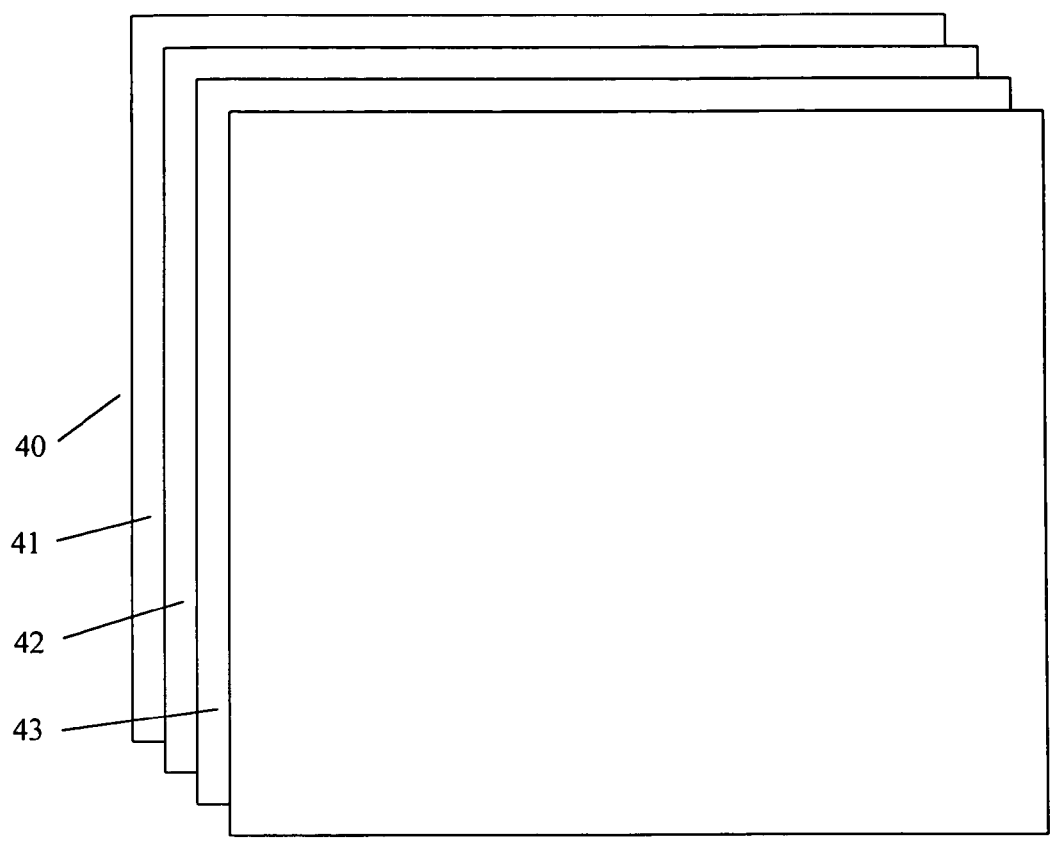
FIG. 4 is an example of multiple GUI windows that may be opened at the same time according to an embodiment of the present disclosure.

Alternatively, expanding GUI elements may open new GUI element windows while leaving the original GUI window present. GUI windows may then be closed by the user as desired. FIG. 4 is an example of multiple GUI windows 40-43 that may be open at the same time.

Figure 5:
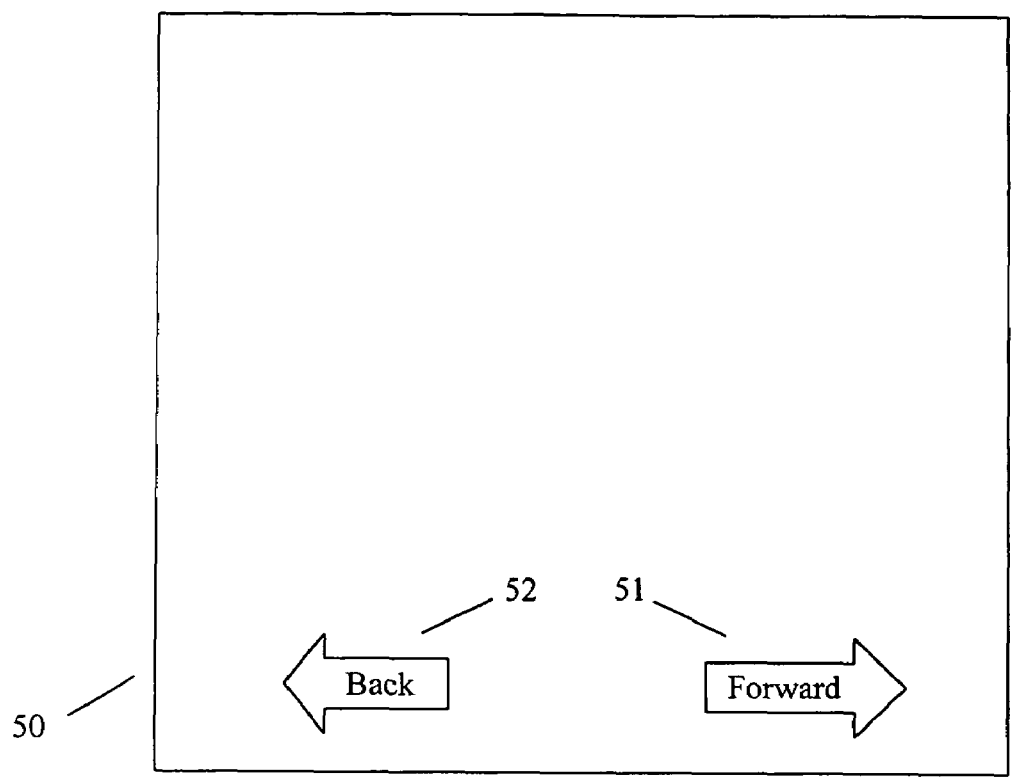
FIG. 5 is an example of a GUI element with forward and back navigation functions according to an embodiment of the present disclosure.

GUI Wizards may be used to present GUI elements to the user. For example, GUI elements may be displayed to the user sequentially along with navigation information. Here complex data may be presented as stages, each stage being displayed separately. Navigation functions such as "forward", "back", and/or "stage x of N" may be provided. FIG. 5 is an example of a GUI element 50 with forward 51 and back 52 navigation functions.

According to embodiments of the present disclosure, GUI elements are created automatically based on the XML data. This has the advantage of ensuring that all XML data elements may be displayed unlike manually created GUIs that may contain errors or omissions.

Figure 6:
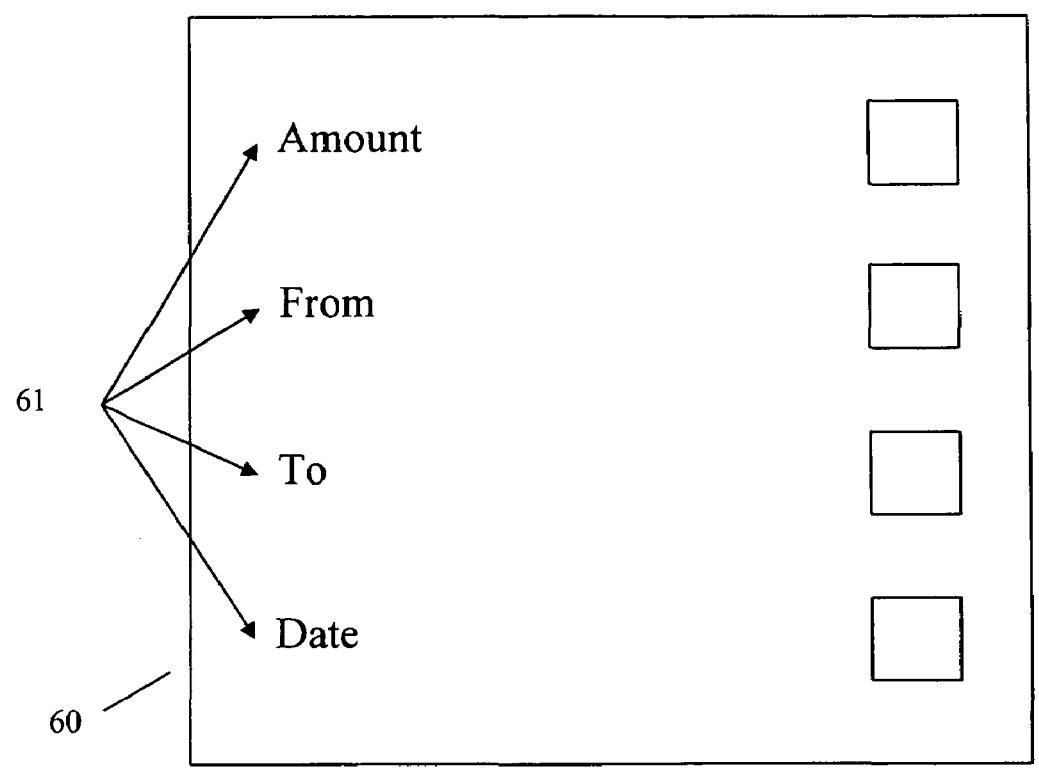
FIG. 6 is an example of a GUI element where the four field names have been simplified by merging a description with the automatically created GUI from FIG. 2.

While GUI elements may be automatically created, it may still be possible for a user to adjust the manner in which XML data is displayed. According to some embodiments of the present disclosure, a user may customize display settings. According to one such embodiment, the user may manually adjust the code of the automatically generated GUI after it has been generated. According to another such embodiment, the user may create a separate description of the required changes, for example as XML code, and these changes may be merged into the automatically generated GUI. This embodiment has the advantage of allowing the description to be merged with any number of automatically created GUIs without having to recreate the description. Descriptions may be used to adjust any display settings or provide for additional GUI functionality. For example, descriptions may be used to provide help menus, expanded descriptions of GUI elements, changes to layouts, for example, font colors, links to other products and programs, and branding and marketing logos and links. FIG. 6 depicts an example GUI element 60 where the four field names 61 have been simplified by merging a description with the automatically created GUI from FIG. 2.

Figure 7:
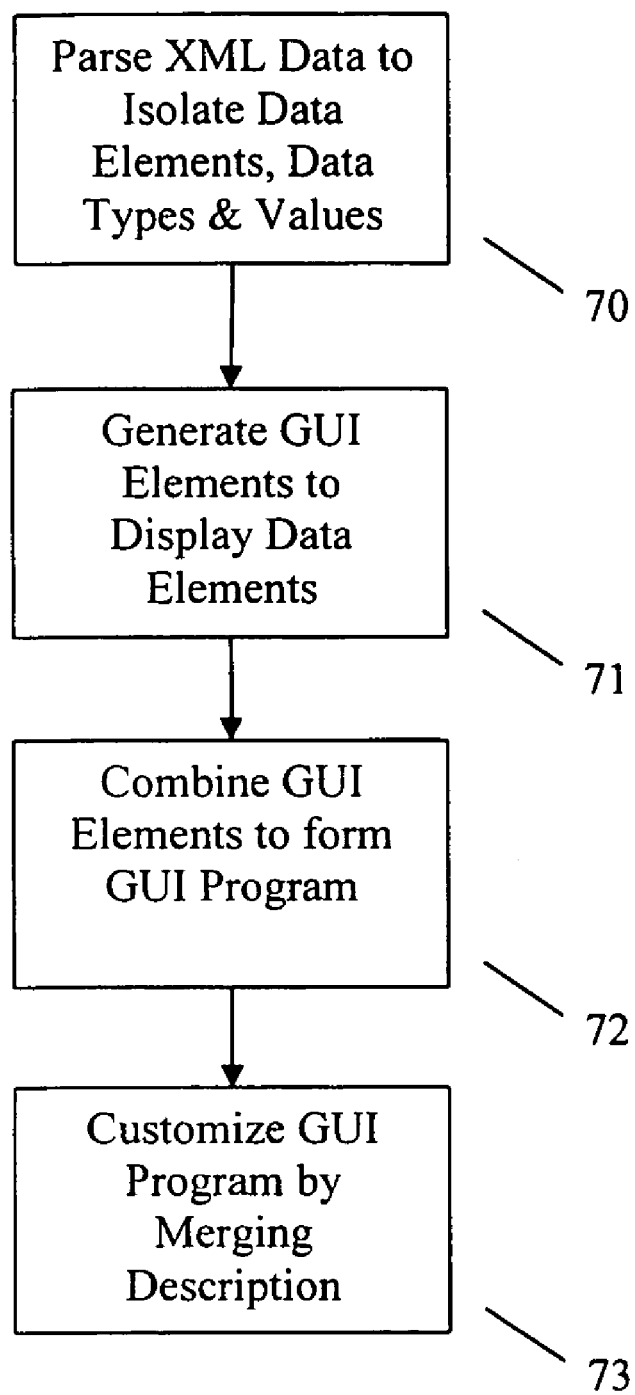
FIG. 7 is a flowchart showing the automatic generation of a GUI from XML data according to an embodiment of the present disclosure.

FIG. 7 is a flowchart showing the automatic generation of a GUI from XML data according to an embodiment of the present disclosure. First, the XML data is automatically parsed (Step S70). This may include identifying various data elements from the XML data, identifying a data type of each of the various identified data elements, and identifying values for each of the various identified data elements.

Next, GUI elements are generated to display the identified data elements (Step S71). Each GUI element may be automatically generated to display the data elements in a manner appropriate for its data type. Where data elements may be hierarchical, respective GUI elements may display the data elements as expandable and/or collapsible. Navigation tools may also be provided for the user to easily navigate the various GUI elements.

The created GUI elements may be combined to form a GUI program for the XML data (Step S72). This GUI program may be written in a computer language, such as, for example, Java. The created GUI program may incorporate tools for manipulating the displayed data.

Finally, the GUI program may be merged with a description of customized features (Step S73). This description may be a file created by a user that incorporates customizations that the user would like to apply to the GUI program.

A web service is an XML aware application, usually accepting XML data embedded in Simple Object Access Protocol (SOAP).

As noted above, although XML data is human readable, users who are not computer programmers may have a very difficult time manipulating data in XML form. Therefore, it is desirable to provide GUIs, specifically, web pages, for users to interact with web services. To do this, a translation server receives data obtained from web pages, maps the data to XML message, and sends the message to a web service. When an XML response message is received, the translation server does the reverse mapping and sends the received data to the web interface.

The highly-standardized nature of XML allows automatic generation of the core code of the translation server. Such automatically generated translation servers can produce complete, legal XML messages, avoiding the risk that developers may accidentally make mistakes in writing the server program, or leave functionality out due to time pressures.

Embodiments of the present disclosure automatically generate translation server programs that can take information from a web page and map it to an XML message, which can then be sent to a web service. The information can be obtained from an HTTP GET or POST operation derived from an HTML web page form. When an XML response message is sent from the web service, the translation server maps it to an HTTP based message and sends it to the web browser. Therefore, embodiments of the present disclosure provide the relatively automatic generation of translation server programs that enable a two-way interactive communication between a web page and a web service.

Figure 8:
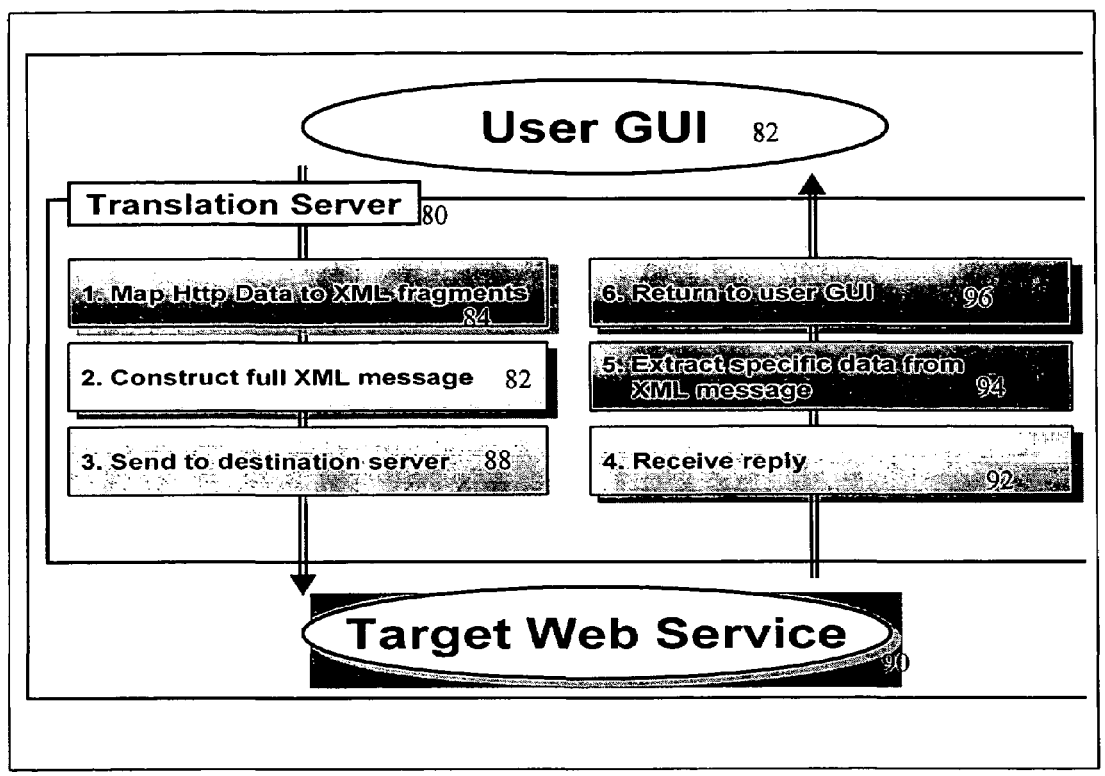
FIG. 8 depicts a translation server according to an embodiment of the present disclosure.

FIG. 8 illustrates an embodiment of the present disclosure showing the relationship between the translation server, the web page, and the web service, showing the basic functions performed by a translation server 80. As shown, the translation server 80 takes information from user GUI 82, maps HTTP data to XML fragments (84), constructs the full XML message 82, and sends it to the destination server 88 in this case target web service 90. Translation server 80 also receives replies 92 from target web service 90, extracts specific data from the XML message 94 and returns it 96 to user GUI 82.

As described earlier, a GUI program such as, for example, a web page, can be automatically generated for the display of XML data. The present disclosure also provides a relatively automated construction of an interactive user interface for a web service.

FIG. 9 is an example of a GUI 82 including data representing a simple bank transaction. Presented in a web page form, it is very easy for the user to view and manipulate the presented data. This compares favorably with the XML representation of the data, illustrated in FIG. 10. In FIG. 10, the XML data 300-328 describes a financial transaction statements (TransactionStatement) data element having one statement instance (Statementinstance) data element 305-327. The statement instance data element 305-327 has a transaction amount (TransactionAmount) data element 306-308, transaction source (TransactionSource) data element 309-314, transaction destination (TransactionDestination) data element 315-320, and a transaction date (TransactionDate) data element 321-326. The statement instance 305-327 is a custom data type made up of data elements defined by primitive data types. Here, transaction amount may be a decimal data type 307, transaction source may be a string data type 312, transaction destination may be a string data type 318, and transaction date may be a dateTime data type 324. The XML example code contains further information, such as the transaction date, the currency type, and so on, but this information can usually be added by the program without explicitly asking the user.

Once the user enters the information requested by the GUI 82, the information is sent to the translation server 80 via a HTTP GET or POST operation. The translation server 80 will parse the HTTP message and extract the data elements. In this example, this involves parsing the HTML form data to extract the Name, the Amount, and the Destination Bank data elements. Parsing an HTTP message can be done in a standard manner. The present system may generate code to parse messages.

The translation server 80 then maps the data elements into XML data. This may be performed in a number of ways. For example, one way is to use a text template method. FIG. 11 is an example of such a template, where the text string "amount" is a place holder tag alerting the server to replace the tag with a value. There are a number of standard computer science techniques for writing such templates. Once the translation server has extracted the Amount data element, it can replace the place holder tag with the data value. When all three data elements have been merged with the template, the result is the XML data shown in FIG. 10.

Another way of performing mapping is to utilize automatically generated code representing the XML data structure and fill in the data structure with data elements extracted in the previous step. The code representing the XML data structure may be a Java class automatically generated from the XML schema. Tools such as 'Caster' from the Apache organization and 'JAXB' from Sun Microsystems can perform this code generation. The Java class generated is a data container, representing the XML data structure (the "Document Object Model Tree", or the "DOM Tree"). The data elements extracted from the previous step can then be used to initialize the data objects contained in the Java container class. The Java data objects can then be used to generate the XML data file.

In both of these mapping methods, the server program does not need to be manually coded, resulting in significant labor savings. Using automatically generated Java objects (e.g. from JAXB) may simplify things further as there will be no need to create the text templates, and the objects may be automatically recreated whenever the schema changes.

The mapping from the information obtained from a web page to XML data is performed according to predetermined criteria. In other words, the mapping is possible because there is a predetermined relationship between the information obtained from the web page and the corresponding XML schema. In the case where the web page is generated from XML data utilizing one or more of the above-described embodiments, this mapping criteria can be determined in accordance with the process of GUI program generation described.

Some extra work may be required to initialize environment variables (such as the current date). In the case of templates, standard methods may be used to insert date and time values. In the case of JAXB created objects, standard code libraries can be created to automatically initialize environment variables such as the current date.

Once the XML data is created, an XML message can be assembled from the XML data. This may involve adding message headers (such as HTTP headers or SOAP headers) to the raw XML data. Code generation for this assembling function is possible due to the standard nature of the assembly. The XML message may then be sent via HTTP/SOAP or the equivalent to the destination web service. The location of the destination of the web service may be pre-configured, or it can be obtained by standard techniques such as interrogation of a UDDI server.

FIG. 12 is an example of an XML response message sent by the web service 90. Translation server 80 transforms the XML data into a form that can be received and displayed by the web GUI 82.

The mapping of raw XML data to relevant data elements may be performed in a number of ways. For example, a template may be used to extract key data from the XML data. FIG. 13 shows a template according to an embodiment of the present disclosure, which contains wild cards and tags 603, 606 for key data positions. The XML data is processed until a match for the key data is obtained and that data extracted. Another example is to use a XML stylesheet transformation. This transformation performs the same function as the template method, but in a standard manner using standard tools. Yet another example involves parsing the XML data using automatically generated code (e.g. via JAXB). Once the XML data is parsed, relevant user data may be extracted directly from pre-determined code objects.

The data fragments extracted from the mapping can then be passed back to the user. The data fragments may be assembled into an HTTP based message or information format and passed to a subsidiary server that would assemble the web page HTML. This could also be done via an XSLT stylesheet.

The present disclosure thus provides for the automatic generation of web GUI programs based on XML data. In addition, the present disclosure provides for the automated generation of translation server code, allowing a two-way interactive communication between the web GUI and the web service. This provides a relatively automated construction of an interactive user interface for a web service.

Figure 14:
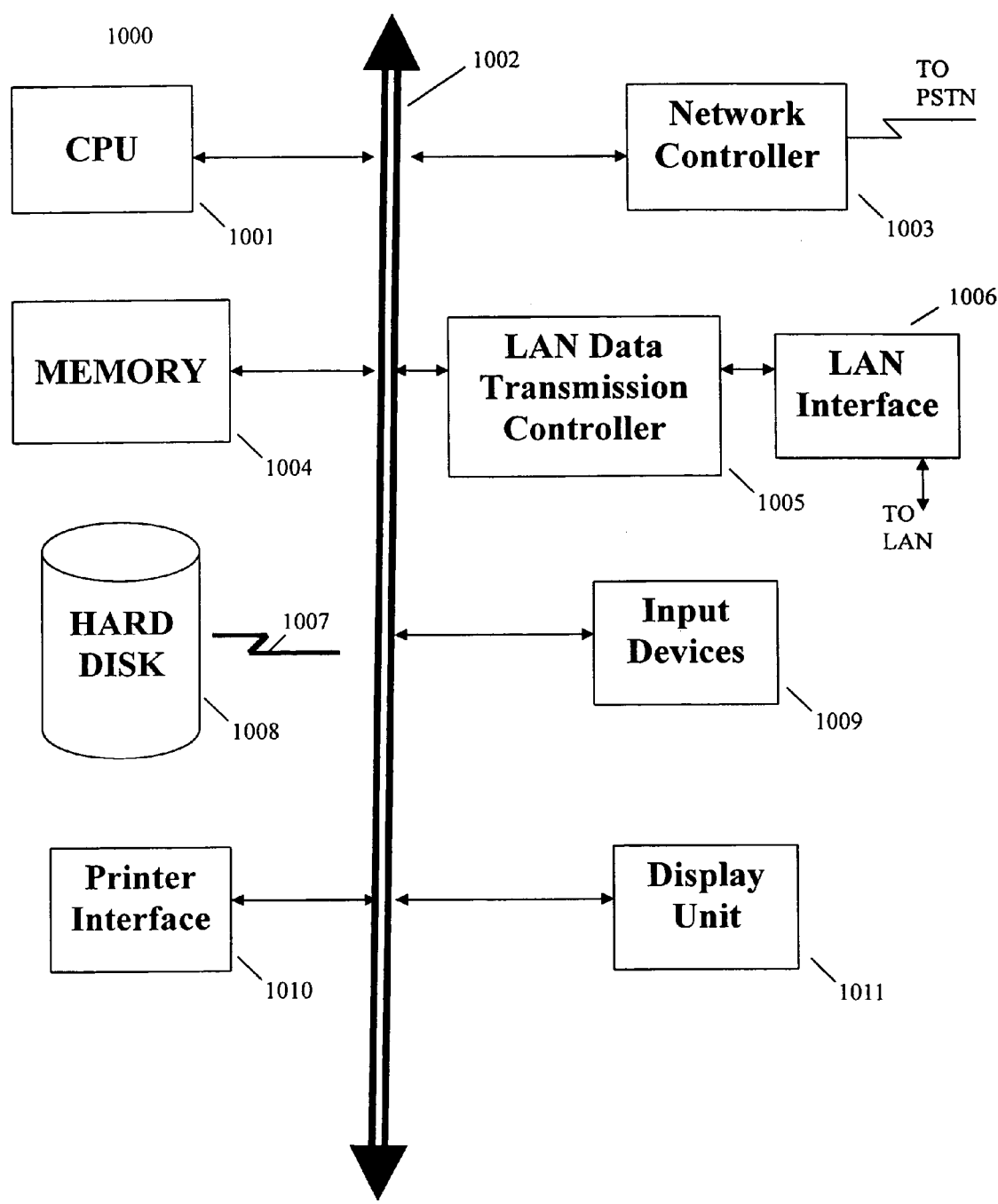
FIG. 14 is an exemplary computer system capable of implementing various embodiments of the present disclosure.

FIG. 14 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal buss 1002, and one or more input devices 1009, for example, a keyboard, mouse etc. As shown, the system 1000 may be connected to a data storage device, for example, a hard disk, 1008 via a link 1002.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for mapping information entered through a GUI program to an XML message, comprising:
   parsing information entered through the GUI program to extract a first plurality of data elements;
   mapping the first plurality of data elements to XML data, the mapping being performed according to predetermined criteria;
   assembling the XML data to a first XML message;
   transmitting the first XML message to a target web service;
   receiving a second XML message from the target web service;
   identifying a second plurality of data elements in the second XML message, each of the second plurality of data elements having a respective data type; and
   automatically generating, without user input and without obtaining user interface data, at least one GUI element for each of the identified second plurality of data elements in the second XML message, the at least one GUI element generated based on a predetermined relationship between the at least one GUI element and an XML schema as identified in the second XML message, the at least one GUI element having a displayed name and a displayed value based on the respective data type.

2. The method of claim 1, wherein mapping the data elements to XML data comprises merging the data elements with a XML text template.

3. The method of claim 1, wherein mapping the data elements to XML data comprises initializing an XML data container with the data elements and using the initialized XML data container to generate XML data, wherein said XML data container is software code automatically generated from the XML schema comprising definitions of a plurality of customized markup symbols.

4. The method of claim 1, wherein the GUI program comprises a web page, and the information is obtained from an HTTP GET or POST operation.

5. A method for mapping an XML message to information that is expected by a GUI program, comprising:
   extracting raw XML data from an XML message;
   identifying a plurality of data elements in the XML message, each of the plurality of data elements having a respective data type;
   mapping the XML data to relevant data elements, the mapping being performed according to predetermined criteria; and
   automatically generating, without user input and without obtaining user interface data at least one GUI element for display by a GUI program for each of the identified plurality of data elements in the XML message, the at least one GUI element generated based on a predetermined relationship between the at least one GUI element and an XML schema as identified in the XML message, the at least one GUI element having a displayed name and a displayed value based on the respective data type.

6. The method of claim 5, wherein mapping the XML data to relevant data elements comprises matching the XML data with an XML text template.

7. The method of claim 5, wherein mapping the XML data to relevant data elements comprises mapping by a standard XML stylesheet transformation (XSLT).

8. The method of claim 5, wherein mapping the XML data to relevant data elements comprises parsing the XML data using automatically generated code and extracting data elements from predetermined code objects.

9. The method of claim 5, wherein the GUI program comprises a web page, and the result of the mapping is information that can be sent by a HTTP GET or POST operation.

10. A method for automatic provisioning of a GUI and a two-way communication between the said GUI and a XML aware application, comprising:
    generating a GUI program from XML data; and
    creating at least one translation server program that performs mapping between XML messages to or from the XML aware application, and information obtained from or destined for the GUI program, wherein mapping between XML messages to or from the XML aware application comprises:
    identifying a plurality of data elements in the XML messages, each of the plurality of data elements having a respective data type; and
    automatically generating, without user input and without obtaining user interface data, at least one GUI element for each of the identified plurality of data elements in the XML messages, the at least one GUI element generated based on a predetermined relationship between the at least one GUI element and an XML schema as identified in the XML messages, the at least one GUI element having a displayed name and a displayed value based on the respective data type.

11. A system for mapping information entered through a GUI program to an XML message, comprising:
    a computer-readable medium; and
    a processor, the processor operable to execute a program of instructions encoded on the computer-readable medium, the program of instructions being operable to perform the following steps:
    parsing information entered through the GUI program to extract a first plurality of data elements;
    mapping the first plurality of data elements to XML data, the mapping being performed according to predetermined criteria;
    assembling the XML data to a first XML message;
    transmitting the first XML message to a target web service;
    receiving a second XML message from the target web service;
    identifying a second plurality of data elements in the second XML message, each of the second plurality of data elements having a respective data type; and
    automatically generating, without user input and without obtaining user interface data, at least one GUI element for each of the identified second plurality of data elements in the second XML message, the at least one GUI element generated based on a predetermined relationship between the at least one GUI element and an XML schema as identified in the second XML message, the at least one GUI element having a displayed name and a displayed value based on the respective data type.

12. The system of claim 11, wherein mapping the data elements to XML data comprises mapping by merging the data elements with a XML test template.

13. The system of claim 11, wherein mapping the data elements to XML data comprises mapping by initializing an XML data container with the data elements and using the initialized data container to generate XML data, wherein said data container is software code automatically generated from the XML schema comprising definitions of a plurality of customized markup symbols.

14. The system of claim 11, wherein the GUI program is a web page, and the information is obtained from an HTTP GET or POST operation.

15. A system for automatically generating server program code that maps an XML message to information that is expected by a GUI program, comprising:
a computer-readable medium; and
a processor, the processor operable to execute a program of instructions encoded on the computer-readable medium, the program of instructions comprising:
an extracting unit for extracting XML data from an XML message;
an identifying unit for identifying a plurality of data elements in the XML message, each of the plurality of data elements having a respective data type;
a mapping unit for mapping the XML data to relevant data elements, the mapping being performed according to predetermined criteria; and
automatically generating, without user input and without obtaining user interface data, unit for generating at least one GUI element for a GUI program for each of the identified plurality of data elements in the XML message, the at least one GUI element generated based on a predetermined relationship between the at least one GUI element and an XML schema as identified in the XML message, the at least one GUI element having a displayed name and a displayed value based on the respective data type.

16. The system of claim 15, wherein the mapping unit for mapping the XML data to relevant data elements matches the XML data with an XML text template.

17. The system of claim 15, wherein the mapping unit for mapping the XML data to relevant data elements performs a standard XML stylesheet transformation (XSLT).

18. The system of claim 15, wherein the mapping unit for mapping the XML data to relevant data element parses the XML data using automatically generated code and extracts data elements from predetermined code objects.

19. The system of claim 15, where the GUI program comprises a web page, and the result of the mapping is information that can be sent by a HTTP GET or POST operation.

20. A system for automatic provisioning of a GUI and a two-way communication between the said GUI and a XML aware application, comprising:
a computer-readable medium; and
a processor, the processor operable to execute a program of instructions encoded on the computer-readable medium, the program of instructions comprising:
a generating unit for automatically generating a GUI program from XML data; and
a code-generation unit for automatically generating at least one translation server program that performs mapping between XML messages to or from the XML aware application, and information obtained from or destined for the GUI program, wherein mapping between XML messages to or from the XML aware application comprises:
identifying a plurality of data elements in the XML messages, each of the plurality of data elements having a respective data type; and
automatically generating, without user input and without obtaining user interface data, at least one GUI element for each of the identified plurality of data elements in the XML messages, the at least one GUI element generated based on a predetermined relationship between the at least one GUI element and an XML schema as identified in the XML messages, the at least one GUI element GUI element having a displayed name and a displayed value based on the respective data type.

21. A computer system comprising:
a processor; and
a computer recording medium including computer executable code executable by the processor for mapping information entered through a GUI program to an XML message, said computer executable code comprising:
code for parsing information entered through the GUI program to extract a first plurality of data elements;
code for mapping the first plurality of data elements to XML data, the mapping being performed according to predetermined criteria;
code for assembling the XML data to a first XML message;
code for transmitting the first XML message to a target web service;
code for receiving a second XML message from the target web service;
code for identifying a second plurality of data elements in the second XML message, each of the second plurality of data elements having a respective data type; and
code for automatically generating, without user input and without obtaining user interface data, at least one GUI element for each of the identified second plurality of data elements in the second XML message, the at least one GUI element generated based on a predetermined relationship between the at least one GUI element and an XML schema as identified in the second XML message, the at least one GUI element having a displayed name and a displayed value based on the respective data type.

22. The computer system of claim 21, wherein the code for mapping the data elements to XML data comprises code for merging the data elements with a XML test template.

23. The computer system of claim 21, wherein code for mapping the data elements to XML data comprises code for initializing an XML data container with the data elements and using the initialized data container to generate XML data, wherein said data container is software code automatically generated from the XML schema comprising definitions of a plurality of customized markup symbols.

24. The computer system of claim 21, where the GUI program is a web page, and the information is obtained from an HTTP GET or POST operation.

25. A computer system comprising:
a processor; and
a program recording medium including computer executable code executable by the processor for mapping an XML message to information that is expected by a GUI program, said computer executable code comprising:
code for extracting raw XML data from an XML message;
code for identifying a plurality of data elements in the XML message, each of the plurality of data elements having a respective data type;
code for mapping the XML data to relevant data elements, the mapping being performed according to predetermined criteria; and
code for automatically generating, without user input and without obtaining user interface data, at least one GUI element for display by a GUI program for each of the identified plurality of data elements in the XML message, the at least one GUI element generated based on a predetermined relationship between the at least one GUI element and an XML schema as identified in the XML message, the at least one GUI element having a displayed name and a displayed value based on the respective data type.

26. The computer system of claim 25, wherein the code for mapping the XML data to relevant data elements comprises code for mapping by matching the XML data with an XML test template.

27. The computer system of claim 25, wherein the code for mapping the XML data to relevant data elements comprises code for mapping by a standard XML stylesheet transformation (XSLT).

28. The computer system of claim 25, wherein the code for mapping the XML data to relevant data elements comprises code for mapping by parsing the XML data using automatically generated code and extracting data elements from predetermined code objects.

29. The computer system of claim 25, wherein the GUI program is a web page, and the result of the mapping is information that can be sent by a HTTP GET or POST operation.

30. A computer system comprising:
   a processor; and
   a computer recording medium including computer executable code executable by the processor for automatic provisioning of a GUI and a two-way communication between the said GUI and a XML aware application, said computer executable code comprising:
   code for generating a GUI program from XML data; and
   code for creating at least one translation server program that performs mapping between XML messages to or from the XML aware application, and information obtained from or destined for the GUI program, wherein mapping between XML messages to or from the XML aware application comprises:
   identifying a plurality of data elements in the XML messages, each of the plurality of data elements having a respective data type; and
   automatically generating, without user input and without obtaining user interface data, at least one GUI element for each of the identified plurality of data elements in the XML messages, the at least one GUI element generated based on a predetermined relationship between the at least one GUI element and an XML schema as identified in the XML messages, the at least one GUI element GUI element having a displayed name and a displayed value based on the respective data type.

31. A computer recording medium including computer executable code for mapping information entered through a GUI program to an XML message, said computer executable code comprising:
   code for parsing information entered through the GUI program to extract a first plurality of data elements;
   code for mapping the first plurality of data elements to XML data, the mapping being performed according to predetermined criteria;
   code for assembling the XML data to a first XML message;
   code for transmitting the first XML message to a target web service;
   code for receiving a second XML message from the target web service;
   code for identifying a second plurality of data elements in the second XML message, each of the second plurality of data elements having a respective data type; and
   code for automatically generating, without user input and without obtaining user interface data, at least one GUI element for each of the identified second plurality of data elements in the second XML message, the at least one GUI element generated based on a predetermined relationship between the at least one GUI element and an XML schema as identified in the second XML message, the at least one GUI element having a displayed name and a displayed value based on the respective data type.

32. The computer recording medium of claim 31, wherein the code for mapping the data elements to XML data comprises code for merging the data elements with a XML text template.

33. The computer recording medium of claim 31, wherein code for mapping the data elements to XML data comprises code for initializing an XML data container with the data elements and using the initialized data container to generate XML data, wherein said data container is software code automatically generated from the XML schema comprising definitions of a plurality of customized markup symbols.

34. The computer recording medium of claim 31, where the GUI program is a web page, and the information is obtained from an HTTP GET or POST operation.

35. A computer recording medium including computer executable code for mapping an XML message to information that is expected by a GUI program, said computer executable code comprising:
   code for extracting raw XML data from an XML message;
   code for identifying a plurality of data elements in the XML message, each of the plurality of data elements having a respective data type;
   code for mapping the XML data to relevant data elements, the mapping being performed according to predetermined criteria; and
   code for automatically generating, without user input and without obtaining user interface data, at least one GUI element for display by a GUI program for each of the identified plurality of data elements in the XML message, the at least one GUI element generated based on a predetermined relationship between the at least one GUI element and an XML schema as identified in the XML message, the at least one GUI element having a displayed name and a displayed value based on the respective data type.

36. The computer recording medium of claim 35, wherein the code for mapping the XML data to relevant data elements comprises code for mapping by matching the XML data with an XML text template.

37. The computer recording medium of claim 35, wherein the code for mapping the XML data to relevant data elements comprises code for mapping by a standard XML stylesheet transformation (XSLT).

38. The computer recording medium of claim 35, wherein the code for mapping the XML data to relevant data elements comprises code for mapping by parsing the XML data using automatically generated code and extracting data elements from predetermined code objects.

39. The computer recording medium of claim 35, wherein the GUI program is a web page, and the result of the mapping is information that can be sent by a HTTP GET or POST operation.

40. A computer recording medium including computer executable code for automatic provisioning of a GUI and a two-way communication between the said GUI an a XML aware application, said computer executable code comprising:

code for generating a GUI program for XML data; and code for creating at least one translation server program that performs mapping between XML messages to or from the XML aware application, and information obtained from or destined for the GUI program, wherein mapping between XML messages to or from the XML aware application comprises:

identifying a plurality of data elements in the XML messages, each of the plurality of data elements having a respective data type; and automatically generating, without user input and without obtaining user interface data, at least one GUI element for each of the identified plurality of data elements in the XML messages, the at least one GUI element generated based on a predetermined relationship between the at least one GUI element and an XML schema as identified in the XML messages, the at least one GUI element having a displayed name and a displayed value based on the respective data type.

* * * * *